US006338770B1

(12) United States Patent
Spranger

(10) Patent No.: US 6,338,770 B1
(45) Date of Patent: Jan. 15, 2002

(54) SELECTIVE HORIZONTAL, CONTINUOUS VERTICAL, SEALING ACTION

(75) Inventor: Lee T. Spranger, Dover, NH (US)

(73) Assignee: Moore North America, Inc., NY (US)

( * ) Notice: Subject to any disclaimer, the term of this patent is extended or adjusted under 35 U.S.C. 154(b) by 0 days.

(21) Appl. No.: 09/502,772

(22) Filed: Feb. 11, 2000

(51) Int. Cl.[7] .............................................. B32B 31/00

(52) U.S. Cl. ....................... 156/290; 156/553; 156/555; 156/582

(58) Field of Search ................................ 156/290, 291, 156/441.5, 548, 553, 555, 581, 580, 582

(56) References Cited

U.S. PATENT DOCUMENTS 4,557,377 A 12/1985 Maloney ..................... 206/219
4,826,475 A 5/1989 Eweryd ....................... 493/10
5,174,493 A 12/1992 File ........................... 229/301
5,201,464 A 4/1993 File ........................... 229/305
5,938,880 A 8/1999 Downing et al. ........... 156/290
5,944,946 A 8/1999 Downing et al. ........... 156/553
6,159,330 A * 12/2000 Spranger .................... 156/290
6,179,952 B1 * 1/2001 Spranger .................... 156/290

* cited by examiner

*Primary Examiner*—James Sells
(74) *Attorney, Agent, or Firm*—Nixon & Vanderhye PC

(57) ABSTRACT

A method and apparatus for sealing a business form having pressure activated adhesive utilizes a minimum amount of equipment in a simple arrangement that has optimum versatility. Sealing is accomplished utilizing a first set of rolls which has a first substantially continuous roll and a second roll having a non-round shape with at least one projection (and typically having a configuration that in end view substantially simulates an airplane propeller including first and second projections angularly spaced about 180°). The first and second rolls are mounted in position for rotation about parallel axes so that the projections come into operative association with the first roll to perform the sealing action in a first position, and at a second position the entire second roll is not in operative association with the first roll. A stepper motor controls the rotation of the second roll. A second set of rolls is provided substantially immediately adjacent the discharge of the first set, and includes first and second rolls, and which are aligned with adhesive patterns of a business form that are perpendicular to the patterns sealed by the first set of rolls.

22 Claims, 4 Drawing Sheets

SELECTIVE HORIZONTAL, CONTINUOUS VERTICAL, SEALING ACTION

BACKGROUND AND SUMMARY OF THE INVENTION

A wide variety of different types of equipment have been developed for sealing pressure activated adhesive (primarily pressure activated cohesive) business forms, and particularly mailer type business forms, such as shown in U.S. Pat. Nos. 5,174,493 and 5,201,464. The equipment developed includes edge sealing rolls which engage only the edge portions of the forms which contain the pressure activated cohesive, or steam roller type rollers which engage the entire forms (where inserts are not used), and often various types of turning mechanisms between sets of rolls so as to seal patterns of adhesive having different orientations. Typically such equipment applies a sealing force of at least 100 pounds per lineal inch, typically about 200 pounds per lineal inch.

In U.S. Pat. Nos. 5,938,880 and 5,944,946 a method and apparatus are disclosed that allow both the "horizontal" and "vertical" patterns of cohesive of mailer type business forms to be sealed in a single pass but without the crushing action provided by steam roll type equipment. While the method and apparatus in those patents is highly useful, it normally effects sealing of the same patterns of adhesive at a number of different locations, and is limited in its ability to adapt to different locations of the patterns of pressure sensitive cohesive on particular forms.

The method and apparatus according to the present invention allow the same advantages as the method and apparatus in U.S. Pat. Nos. 5,938,880 and 5,944,946 as far as being able to effectively seal both vertical and horizontal patterns of pressure activated adhesive in a single unidirectional path and without utilizing a steam roller action which can crush inserts or portions of the form between the patterns, but does so with greatly enhanced versatility, and also in a very cost effective manner. This enhanced versatility and cost effectiveness are provided by utilizing two different sets of rolls. The first set includes a first roll that is substantially continuous but a second roll which is non-round and has projection portions which are the only portions of the roll that can effectively seal with the first roll. The second roll is controlled by a stepper motor, in turn controlled by a microprocessor, so that a projection of the second roll can be brought into operative association with the first roll whenever desired, whether at a regular interval or irregular interval, in order to effectively seal a pressure activated adhesive pattern which is substantially parallel to the axes of rotation of the rolls. A second set of rolls, for sealing pressure activated adhesive patterns that are substantially perpendicular to the axes or rotation of the first set of rolls, is preferably provided substantially immediately adjacent the discharge from the first set of rolls, and includes a continuous roll and a pair of rolls that cooperate with the continuous roll (second and third rolls) and which are on a substantially common axis. The positions of the second and third rolls with respect to each other and the first roll may be adjusted so as to accommodate different widths of forms (spacings between the pressure activated cohesive patterns to be sealed by the second set of rolls). No further sealing equipment is necessary.

According to one aspect of the present invention there is provided a method of sealing a business form having pressure activated adhesive including a first pattern in a first dimension, and a second pattern in a second dimension substantially transverse to the first dimension, comprising:

(a) Moving the form in a direction substantially parallel to the second dimension; and while practicing (a). (b) At only a first location, automatically applying at least about 100 pounds per lineal inch of pressure to the form at the second adhesive pattern to seal the form at the second adhesive pattern substantially without engaging any other portion of the form. And (c) at only a second location, spaced in the direction of movement of the form, automatically applying at least about 100 pounds per lineal inch of pressure to the form at the first adhesive pattern.

Typically (b) is practiced using a first set of rolls including a first substantially continuous roll having a length greater than the length of the second adhesive pattern, and a second roll having a non-round shape with at least one projection having a length greater than the length of the second adhesive pattern and comprising the only part of the second roll cooperating with the first roll to seal the first adhesive pattern. Also typically (c) is practiced using a second set of rolls including a first substantially continuous roll and a second substantially continuous roll, the second set of rolls aligned with the first adhesive pattern of the business form.

When the form comprises two first substantially parallel patterns of adhesive spaced from each other a first distance in the second dimension, then (c) is further practiced using a third roll of the second set rotatable about an axis substantially common with that of said second roll, and operatively spaced approximately the first distance from the second roll in the second dimension, so that the second and third rolls of the second set cooperate with the first roll of the second set to substantially simultaneously seal the two first patters of adhesive of the form. Where the form comprises two second substantially parallel patterns of adhesive spaced from each other a second distance in the first dimension, then (b) is further practiced to selectively rotate the first roll of the first set to come into contact with the form at both second patterns of adhesive to seal the form at both second patterns, but so as to substantially not come in contact with the form between the two second patterns of adhesive. When the form comprises a third second pattern of adhesive substantially parallel to both of the two second patterns of adhesive, disposed between the two second patterns in the first dimension, then (b) is further practiced to selectively rotate the first roll of the first set to come into contact with the form at all three of the second patterns of adhesive to seal the form at all three second patterns, but so as to substantially not come in contact with the form between the second patterns of adhesive.

In the preferred embodiment (a)–(c) are practiced so as to first move the form into operative association with the first set of rolls, and then into operative association with the second set of rolls. The invention also further comprises adjusting the positions of the second and third rolls of the second set with respect to each other along the common axis, to accommodate forms having different spacings between the second patterns of adhesive. The adjustment may be accomplished using any conventional mechanism or technique.

According to another aspect of the present invention a sealing apparatus is provided. The sealing apparatus comprises or consists of the following components: A first set of rolls comprising a first substantially continuous roll, and a second roll having a non-round shape with at least one projection, the first and second rolls mounted and positioned for rotation about substantially parallel axes and so that at a first position the at least one projection comes into operative association with the first roll to perform a sealing action, but the second roll besides the at least one projection not coming into operative association with the first roll, and at a second position the at least one projection is not in operative association with the first roll. A stepper motor operatively connected to the second roll of the first set so as to effect rotation thereof to move the at least one projection between the first and second positions. And a second set of rolls including a first substantially continuous roll having a first length and a second substantially continuous roll having a second length less than about half of the first length, the first and second rolls of the second set mounted and positioned for rotation about substantially parallel axes which are also parallel to the axes of the rolls of the first set of rolls.

Preferably the first set of rolls has a discharge which discharges material being sealed thereby in a first direction; and the second set of rolls is positioned substantially immediately adjacent the first set of rolls discharge in the first direction to receive material discharged from the discharge between the first and second rolls of the second set. Preferably the second set of rolls comprises the third roll substantially concentric with the second roll and rotatable about a substantially common axis, the third roll spaced from the second roll along the substantially common axis.

In order to provide a minimal amount of material while still having optimum operability, the second roll of the first set preferably has a configuration that in end view simulates an airplane propeller so that the at least one projection comprises first and second projections angularly spaced from each other about 180 degrees. Preferably the second roll of the first set is positioned above the first roll of the first set, and the first and second rolls are rotatable about substantially horizontal axes. Also, the stepper motor is typically connected to a microprocessor which controls the stepper motor.

In the normal use, the first and second sets of rolls are positioned and mounted so as to receive therebetween business forms having pressure activated adhesive, and the sets of rolls are capable of applying at least about 100 pounds of pressure per lineal inch to business forms disposed between the first and second rolls of each of the first and second sets of rolls.

According to yet another aspect of the present invention a set of pressure applying rolls per se is provided. The set of rolls comprises: A first substantially continuous roll rotatable about a first axis. A second non-round roll having a configuration that in end view substantially simulates an airplane propeller, including at least first and second projections angularly spaced from each other, and rotatable about a second axis substantially parallel to the first axis. The first and second rolls mounted and positioned so that at a first position one of the projections comes into operative association with the first roll to perform a sealing action, but the second roll besides the projections not coming into operative association with the first roll, and at a second position the projections are not in operative association with the first roll. And the second roll positioned above the first roll, and the first and second axes comprising substantially horizontal axes.

The first set of rolls also preferably comprises a stepper motor operatively connected to the second roll so as to effect rotation thereof to move the projections between the first and second positions. The second non-round roll may have exactly two projections angularly spaced from each other about 180°.

It is the primary object of the present invention to provide for the simple, versatile, and cost effective sealing of business forms having pressure activated adhesive, and apparatus for that purpose. This and other objects of the invention will become clear from an inspection of the detailed description of the invention and from the appended claims.

DETAILED DESCRIPTION OF THE DRAWINGS

Figure 1:
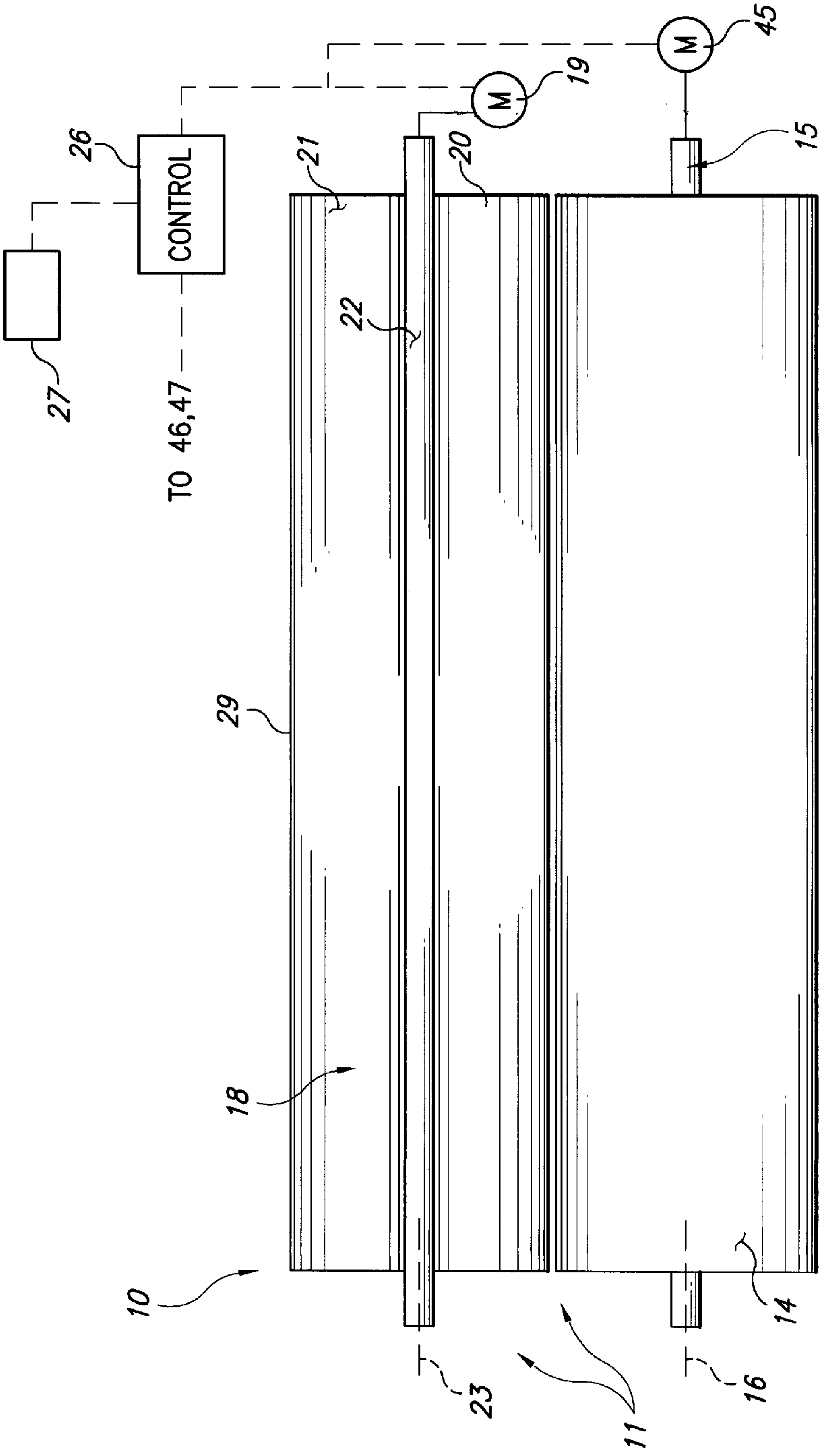
FIG. 1 is an end view, looking in on the first set of rolls, of an exemplary sealing apparatus according to the present invention for practicing the exemplary method according to the invention.
Figure 2:
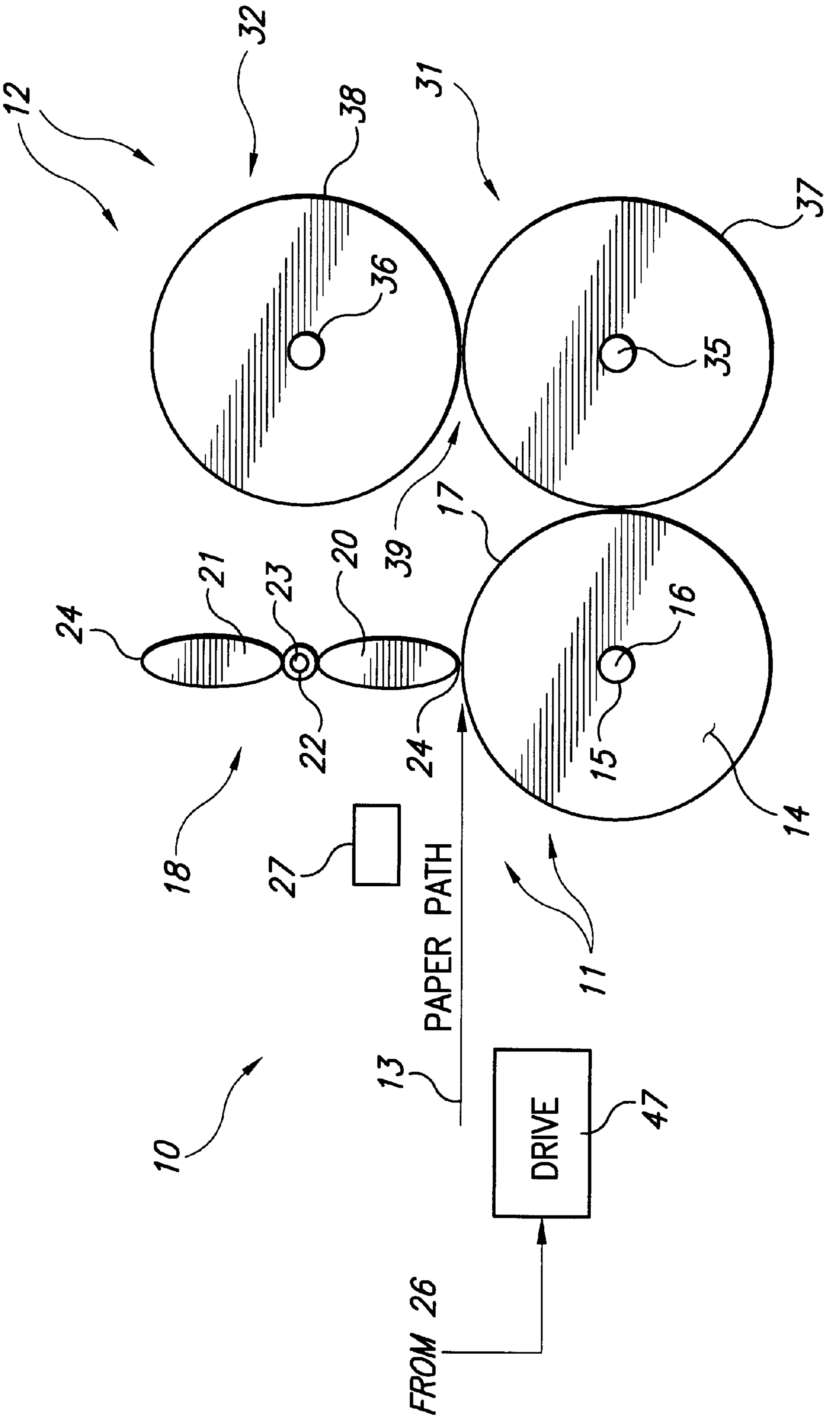
FIG. 2 is a side view of the sealing apparatus of FIG. 1.
Figure 3:
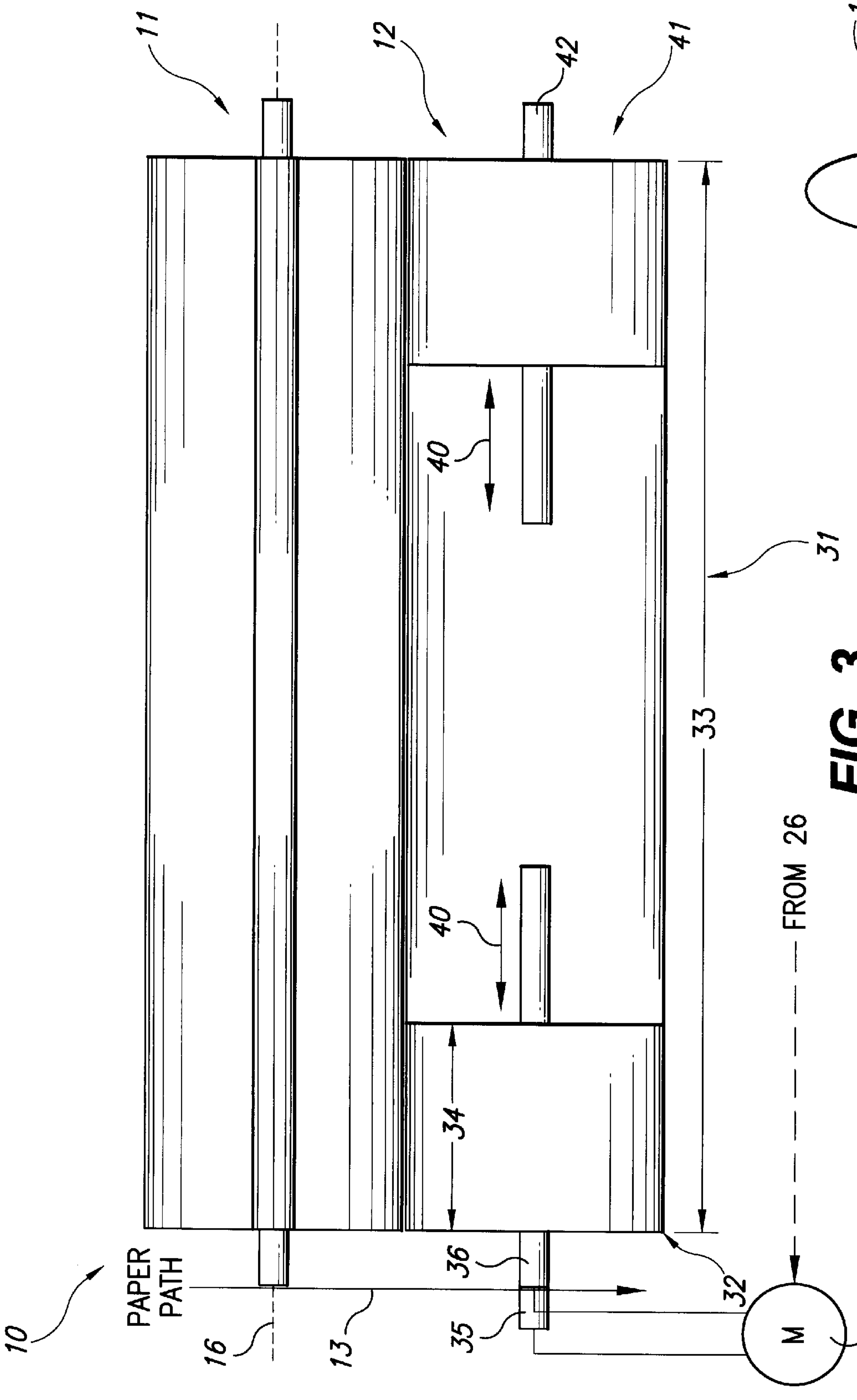
FIG. 3 is a top view of the sealing apparatus of FIGS. 1 and 2.

FIGS. 1 through 3 illustrate an exemplary embodiment of a sealing apparatus according to the present invention, particularly useful in the practice of the method of sealing a business form having pressure activated adhesive. The business forms with which the sealing apparatus 10 of FIGS. 1 through 3 is used are preferably those sold by Moore North America, Inc. under trademark "Sealermate®" having pressure activated adhesive (cohesive), such as exemplified by U.S. Pat. Nos. 5,174,493 and 5,201,464, the disclosures of which are hereby incorporated by reference herein.

The apparatus 10 comprises a first set of rolls 11 and a second set of rolls 12. Forms are fed into association with the apparatus 10 substantially in the direction 13 seen in FIGS. 2 and 3, which is substantially perpendicular to the axes of rotation of the rollers of the sets 11, 12 as hereinafter described.

A first set of rolls 11, as seen in all of FIGS. 1 through 3, preferably comprises a first substantially continuous roll 14, a conventional round roll having a shaft 15 which defines an axis of rotation 16 about which the roll 14 rotates. The round exterior surface 17 of the roll 14 is typically hard and substantially unyielding, such as made of steel, and is capable, when cooperating with the second, upper, roll 18 of the first set 11, of applying a sealing force to a business form moving in the path 13 of at least about 100 pounds per lineal inch, e.g. about 200 pounds per lineal inch.

Figure 4:
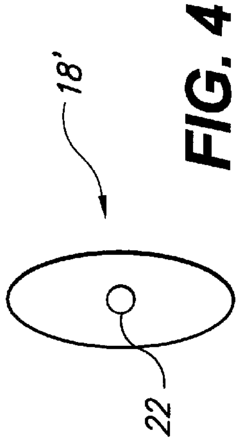
FIG. 4 is a side view of another exemplary configuration of the top roll of the first set of rolls of the sealing apparatus according to the invention.

The second, upper, roll 18 of the first set 11 has a non-round configuration. While two exemplary configurations thereof are illustrated in FIGS. 1 through 3 on one hand, and FIG. 4 on the other (roll 18' in FIG. 4), a wide variety of other configurations also may be provided. The construction of the roll 18 in FIGS. 1 through 3 is the preferred construction, however, because that has a minimal amount of material which not only reduces the cost of the roll, but since it has a minimal amount of material that contacts the form reduces the pressure necessary to cause a suitable seal. Also the construction illustrated in FIGS. 1 through 3 has less weight than most other constructions, so that the roll is very responsive, and a smaller stepper motor (as hereinafter described) 19 (see FIG. 1) may be used to effect rotation thereof.

The configuration of the roll 18 in FIGS. 1 through 3 is, in end view, one that substantially simulates an airplane propeller having at least first and second projections 20, 21 that are substantially uniformly extending from a central shaft 22 which is substantially parallel to the shaft 15 so that the roll 18 is rotatable about an axis of rotation 23 substantially parallel to the axis 16, and substantially perpendicular to the path 13. While in the preferred embodiment shown two projections 20, 21 are provided, angularly spaced from each other approximately 180°, it is to be understood that three or even more projections could be provided, and preferably uniformly angularly spaced from each other around the shaft 22.

The shafts 15, 22 are mounted by suitable conventional bearings or the like (which may have a conventional adjustment mechanism for adjusting the spacing between the rolls 14, 18) so that the distal portions 24 of the projections 20, 21, when in closest proximity to the surface 17 of the first roll 14, are slightly spaced from each other, the spacing between approximately equal to the thickness of the folded business form to be handled thereby. However, the rolls may be spring pressed together so that the projection distal portions 24 actually touch the surface 17, but that is not preferred, rather a uniform, though adjustable, spacing is always provided between the projection distal portions 24 and the surface 17.

The conventional stepper motor 19 is preferably controlled by a conventional microprocessor, such as illustrated schematically at 26 in FIG. 1. The control, and control circuitry, supplied by the conventional microprocessor 26 can be very similar to that of a conventional rotary cutter. A sensor (such as an optical sensor) 27 (see FIGS. 1 and 2) is preferably provided to sense the leading edge of the form moving in the path 13 into the nip between the rolls 14, 18 of the first set 1 1, such sensing by the sensor 27 triggering an operation of the conventional stepper motor 19 to rotate the roll 18 so as to bring one of the distal portions 24 of the projection 20, 21 into operative contact with a portion of the business form having a pressure activated adhesive pattern substantially parallel to the axes 16, 23 so that sealing thereof is effected at the nip between the rolls 18, 14.

Except when one of the distal portions of a projection 20, 21 is in operative association with the surface 17 of the roll 14, the roll 18 is never in sealing position with respect to the business form moving in the path 13. For example, if the roll 18 is rotated more than a few degrees from the operative position illustrated in FIGS. 1 through 3, it is in an inoperative position wherein no sealing, or other effect, on the business form is provided by the first set of rolls 11. For example, if the roll 18 is rotated 90° from the position illustrated in FIG. 2, there clearly is no interaction between the roll 18 and the business form moving in the path 13.

The shaft 22 and projections 20, 21 also preferably are of metal or other hard material, and are capable, with the roll 14, of applying a pressure of at least 100 pounds per lineal inch to a form at the nip between the rolls 14, 18 when the roll 18 is in the position illustrated in FIGS. 1 through 3. While the airplane propeller simulating -configuration illustrated in FIGS. 1 through 3 has many advantages, it is to be understood that other configurations could also be provided such as the elliptical configuration illustrated at 18' in FIG. 4, or a conventional round roll may be provided which has bumps forming projections at various locations therealong with the bumps spaced far enough from the surface of the round roll so that the surface of the round roll never operatively engages a business form fed in the nip between the rolls 18, 14. Other conventional constructions of label rolls may also be provided.

The length 29 (see FIG. 1) of the rolls 14, 18 may be substantially the same, and in one preferred embodiment for handling a wide variety of different types of business forms, such as mailer type business forms, the length 29 is about 11 inches.

The second set of rolls 12, visible in FIGS. 2 and 3, includes a first substantially continuous bottom roll 31, and a second substantially continuous upper roll 32. As seen in FIG. 3, the first roll 31 has a length 33 which is substantially the same as the length 29, e.g. about 11 inches. However, the second roll 32 has a length 34 which is less than half the length 33, e.g. about 2 inches. The rolls 31 and 32 are mounted and positioned (e.g. by conventional bearings) so that they are rotatable about substantially parallel axes, which axes are substantially parallel to the axes 16, 23. For example, as schematically illustrated in FIGS. 2 and 3, the first roll 31 is mounted by a shaft 35 while the second roll 32 is mounted by a shaft 36. While the rolls 31, 32 could be spring pressed together, preferably the rolls 31, 32 are also positively mounted so that there is a slight spacing between the peripheries 37, 38 thereof so that at the nip 39 therebetween there is a spacing approximately equal to the thickness of a folded business form to be sealed thereby. Preferably both of the rolls 31, 32 are made of metal, such as steel, and have a substantially unyielding peripheral surface 37, 38.

The position of the roll 32 with respect to the roll 31 is adjustable, as indicated by the arrows 40 in FIG. 3, along the axis of rotation thereof defined by the shaft 36. Adjustment in the dimension 40 may be accomplished utilizing any suitable conventional equipment for that purpose.

The length 34 of the roll 32 is designed so as to seal only edge portions of a form passing through the nip 39, and not to provide a steam roller type action. In the preferred embodiment of the invention the set 12 also comprises a third roll 41 which is substantially identical to the roll 32 except positioned on the opposite edge of the first roll 31 from the second roll 32, and is rotatable about a shaft 42 which has a substantially common axis with the shaft 36. The second roll 41 is also adjustable in the dimension 40 utilizing conventional equipment, and when both the rolls 32, 41 are active they seal side edges of a form passing through the nip 39 at the same time. If desired, one or both of the rolls 32, 41 may be mounted on a mechanism that allows the roll 32, 41 to be moved away from the roll 31 into an inoperative position. The adjustment in the dimension 40 preferably accommodates forms having spacings in the dimension 40 between pressure activated cohesive patterns of between about 5–11 inches.

In the preferred embodiment illustrated in the drawings, preferably a second set of rolls are positioned substantially immediately adjacent the discharge from the first set of rolls 11. That is, the spacing (best seen in FIG. 2) between the sets 11, 12 is no more than the distance necessary to allow the roll 18 to clear the roll 32.

The rolls 14, 31, 32 can be powered—as indicated schematically by the motors 45, 46 in FIGS. 1 and 3, or by gear trains instead of or in addition to the motors, controlled by the microprocessor control 26. However, preferably a separate drive as shown schematically at 47 in FIG. 2—is provided to transport the forms in the path 13 through the sets of rolls 11, 12, and then to some other location downstream of the rolls 12. The drive 47, which is illustrated only schematically because it is conventional, may comprise conventional rollers, conveyor belts, or the like. The drive 47 also may be controlled by the microprocessor 26.

Figure 5:
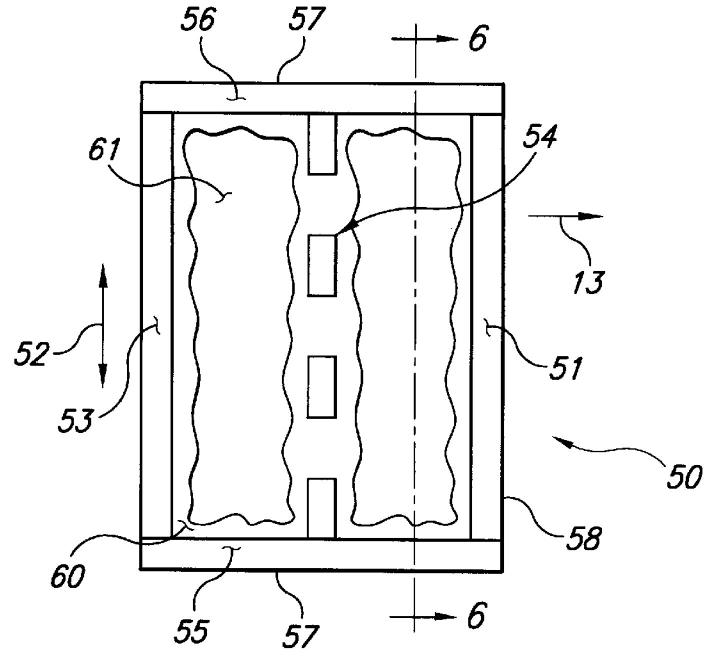
FIG. 5 is a top plan schematic view showing a business form having various pressure activated cohesive patterns associated therewith and with the overlaying portions of the form cut away for clarity of illustration.
Figure 6:
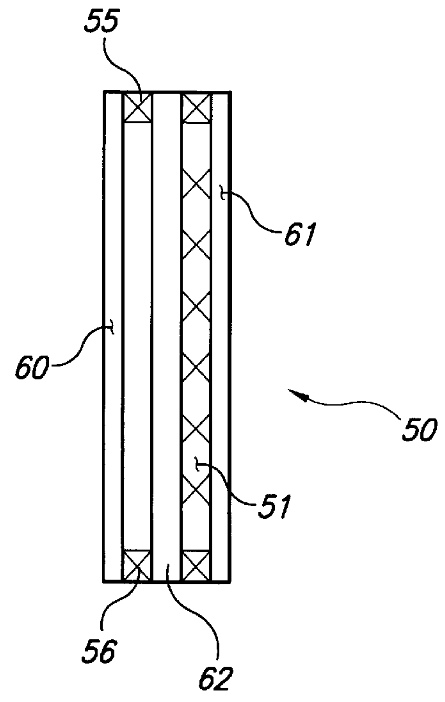
FIG. 6 is a schematic cross-sectional view taken along lines 6—6 of the form of FIG. 5 with the components greatly exaggerated in size for clarity of illustration, and adhesive patterns illustrated by Xs.

FIGS. 5 and 6 schematically illustrate an exemplary form that may be sealed utilizing the apparatus of FIGS. 1 through 3. The form is shown generally by reference numeral 50 and includes at least a first pattern 51 of pressure activated adhesive (cohesive) in a first dimension 52, substantially perpendicular to the direction 13 and substantially parallel to the axes 16, 23. In the embodiment illustrated in FIG. 5 there is also a second pattern of pressure activated cohesive 53 in the dimension 52, and a third pattern 54, the patterns 51, 53, 54 being substantially parallel to each other. The patterns 51, 53, 54 may be substantially continuous strips of cohesive, as indicated by the patterns 51, 53, or may be discontinuous strips, such as shown at 54, made up of a plurality of spaced boxes, dots, or other configurations of adhesive. However, the patterns 51, 53, 54 are not restricted to strips, but may be any suitable conventional type of pattern used with pressure activated cohesive.

The form 50 also comprises one or more patterns of pressure activated cohesive 55, 56 parallel to the direction 13 and substantially transverse to the dimension 52. The patterns 55, 56 are adjacent the side edges 57 of the form 50 and substantially perpendicular to the leading edge 58 of the form 50, and may be of any conventional pattern type as described above with respect to the patterns 51, 53, 54.

FIG. 5 shows a bottom surface 60 of the form 50, with the top surface or surfaces 61 cut away so as to illustrate the patterns of cohesive, and is only exemplary. It is to be understood that any type of conventional pressure seal form may be utilized including V-fold, double parallel eccentric C-fold, C-fold, Z-fold and eccentric Z-fold, with or without built-in reply envelopes, and with or without inserts. FIG. 6 is a schematic cross-sectional view along line 6—6 of FIG. 5 of a Z-fold form, having an intermediate paper ply 62 between the top and bottom plies 61, 60, respectively, with the cohesive patterns shown schematically by Xs.

In the practice of the method of the present invention the first procedure is (a) moving the form 50 in the direction 13 (such as by using the conventional drive 47), and while (a) is being practiced: (b) at only a fist location (that is the first set of rolls 11 in the preferred embodiment), automatically applying at least about 100 pounds per lineal inch of pressure to the form at the second adhesive pattern or patterns 51, 53, 54 to seal the form at the second adhesive patterns 51, 53, 54 substantially without engaging any other portion of the form; and (c) at only a second location (e.g. 12 in the preferred embodiment), automatically applying at least about 100 pounds per lineal inch of pressure to the form at the first adhesive pattern or patterns 55, 56 to seal the form at the first adhesive patterns 55, 56 substantially without engaging any other portion of the form. Preferably (a)–(c) are practiced so as to first move the form 50 into operative association with the first set of rolls 11 so that sealing takes place at each of the patterns 51, 54, and 53, and then into contact with the second set of rolls 12 where sealing takes place at the patterns 55, 56 using the rolls 32, 41, respectively. To seal at the patterns 51, 54, 53 after the sensor 27 senses the leading edge 58 of the form 50, and knowing (based upon information input into the microprocessor 26) where the patterns 51, 54, 53 will be with respect to that leading 58, the microprocessor 26 controls the stepper motor 19 so as to rotate the roll 18 to bring a distal portion 24 of each of the projections 20, 21 into operative association with the surface 17 of the roll 14 at each of the patterns 51, 54, 53 to apply the appropriate pressure to the form 50 thereat.

Depending upon the configuration of the form it may be only have one of the patterns 51, 53, 54 and only one of the patterns 55, 56, or may have additional patterns aside from those illustrated in FIG. 5, and it may have inserts. In any event, however, the construction and construction of the roll sets 11,12 may readily accommodate the positions of the patterns, and their spacing as by adjusting the positions between the rolls 32, 41 in the dimension 40, and operating the roll 18 with the stepper motor 19.

It will thus be seen that according to the present invention a versatile, cost effective, and advantageous method and apparatus are provided for sealing business forms having pressure activated adhesive, or the like. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. A method of sealing a business form having pressure activated adhesive including a first pattern in a first dimension, and a second pattern in a second dimension substantially transverse to the first dimension, comprising:

(a) moving the form in a direction substantially parallel to the second dimension; and while practicing (a):

(b) at only a first location, automatically applying at least about 100 pounds per lineal inch of pressure to the form at the second adhesive pattern to seal the form at the second adhesive pattern substantially without engaging any other portion of the form; and (c) at only a second location, automatically applying at least about 100 pounds per lineal inch of pressure to the form at the first adhesive pattern to seal the form at the first adhesive pattern substantially without engaging any other portion of the form.

2. A method as recited in claim 1 wherein (b) is practiced using a first set of rolls including a first substantially continuous roll having a length greater than the length of the second adhesive pattern, and a second roll having a non-round shape with at least one projection having a length greater than the length of the second adhesive pattern and comprising the only part of the second roll cooperating with the first roll to seal the second adhesive pattern.

3. A method as recited in claim 2 wherein (c) is practiced using a second set of rolls including a first substantially continuous roll and a second substantially continuous roll, the second set of rolls aligned with the first adhesive pattern of the business form.

4. A method as recited in claim 3 wherein the form comprises two first substantially parallel patterns of adhesive spaced from each other a first distance in the second dimension, and wherein (c) is further practiced using a third roll of the second set rotatable about an axis substantially common with that of said second roll, and operatively spaced approximately the first distance from the second roll in the second dimension, so that the second and third rolls of the second set cooperate with the first roll of the second set to substantially simultaneously seal the two first patters of adhesive of the form.

5. A method as recited in claim 4 wherein the form comprises two second substantially parallel patterns of adhesive spaced from each other a second distance in the first dimension, and wherein (b) is further practiced to selectively rotate the first roll of the first set to come into contact with the form at both second patterns of adhesive to seal the form at both second patterns, but so as to substantially not come in contact with the form between the two second patterns of adhesive.

6. A method as recited in claim 5 wherein the form comprises a third second pattern of adhesive substantially parallel to both of the two second patterns of adhesive, and disposed between the two second patterns in the first dimension, and wherein (b) is further practiced to selectively rotate the first roll of the first set to come into contact with the form at all three of the second patterns of adhesive to seal the form at all three second patterns, but so as to substantially not come in contact with the form between the second patterns of adhesive.

7. A method as recited in claim 3 wherein (a)–(c) are practiced so as to first move the form into operative association with the first set of rolls, and then into operative association with the second set of rolls.

8. A method as recited in claim 1 wherein (c) is practiced using a second set of rolls including a first substantially continuous roll and a second substantially continuous roll, the second set of rolls aligned with the first adhesive pattern of the business form.

9. A method as recited in claim 8 wherein the form comprises two first substantially parallel patterns of adhesive spaced from each other a first distance in the second dimension, and wherein (c) is further practiced using a third roll of the second set rotatable about an axis substantially common with that of said second roll, and operatively spaced approximately the first distance from the second roll in the second dimension, so that the second and third rolls of the second set cooperate with the first roll of the second set to substantially simultaneously seal the two first patters of adhesive of the form.

10. A method as recited in claim 2 wherein the form comprises two second substantially parallel patterns of adhesive spaced from each other a second distance in the first dimension, and wherein (b) is further practiced to selectively rotate the first roll of the first set to come into contact with the form at both second patterns of adhesive to seal the form at both second patterns, but so as to substantially not come in contact with the form between the two second patterns of adhesive.

11. A method as recited in claim 10 wherein the form comprises a third second pattern of adhesive substantially parallel to both of the two second patterns of adhesive, and disposed between the two second patterns in the first dimension, and wherein (b) is further practiced to selectively rotate the first roll of the first set to come into contact with the form at all three of the second patterns of adhesive to seal the form at all three second patterns, but so as to substantially not come in contact with the form between the second patterns of adhesive.

12. A method as recited in claim 4 further comprising adjusting the positions of the second and third rolls of the second set with respect to each other along the common axis.

13. A sealing apparatus comprising:

a first set of rolls comprising a first substantially continuous roll, and a second roll having a non-round shape with at least one projection, said first and second rolls mounted and positioned for rotation about substantially parallel axes and so that at a first position said at least one projection comes into operative association with said first roll to perform a sealing action, but said second roll besides said at least one projection not coming into operative association with said first roll, and at a second position said at least one projection is not in operative association with said first roll;

a stepper motor operatively connected to said second roll of said first set so as to effect rotation thereof to move said at least one projection between said first and second positions; and a second set of rolls including a first substantially continuous roll having a first length and a second substantially continuous roll having a second length less than about half of said first length, said first and second rolls of said second set mounted and positioned for rotation about substantially parallel axes which are also parallel to said axes of said rolls of said first set of rolls.

14. Apparatus as recited in claim 13 wherein said first set of rolls has a discharge which discharges material being sealed thereby in a first direction; and wherein second set of rolls is positioned substantially immediately adjacent said first set of rolls discharge in said first direction to receive material discharged from said discharge between said first and second rolls of said second set.

15. Apparatus as recited in claim 14 wherein said second set of rolls comprises a third roll substantially concentric with said second roll and rotatable about a substantially common axis, said third roll spaced from said second roll along said substantially common axis.

16. Apparatus as recited in claim 13 wherein said second roll of said first set has a configuration that in end view simulates an airplane propeller so that said at least one projection comprises first and second projections angularly spaced from each other about 180 degrees.

17. Apparatus as recited in claim 16 wherein said second roll of said first set is positioned above said first roll of said first set, and said first and second rolls are rotatable about substantially horizontal axes.

18. Apparatus as recited in claim 17 wherein said stepper motor is connected to a microprocessor which controls said stepper motor.

19. Apparatus as recited in claim 13 wherein said first and second sets of rolls are positioned and mounted so as to receive therebetween business forms having pressure activated adhesive, and said sets of rolls are capable of applying at least about 100 pounds of pressure per lineal inch to business forms disposed between said first and second rolls of each of said first and second sets of rolls.

20. A set of pressure applying rolls, comprising:

a first substantially continuous roll rotatable about a first axis;

a second non-round roll having a configuration that in end view substantially simulates an airplane propeller, including at least first and second projections angularly spaced from each other, and rotatable about a second axis substantially parallel to said first axis;

said first and second rolls mounted and positioned so that at a first position one of said projections comes into operative association with said first roll to perform a sealing action, but said second roll besides said projections not coming into operative association with said first roll, and at a second position said projections are not in operative association with said first roll; and said second roll positioned above said first roll, and said first and second axes comprising substantially horizontal axes.

21. A set of rolls as recited in claim 20, further comprising a stepper motor operatively connected to said second roll so as to effect rotation thereof to move said projections between said first and second positions.

22. A set of rolls as recited in claim 20, wherein said second non-round roll has exactly two projections, angularly spaced from each other about 180°.

* * * * *